Oct. 14, 1952   J. C. DIONNE   2,614,154
VERTICAL SPLIT HEAD DETECTING APPARATUS
Filed March 28, 1950
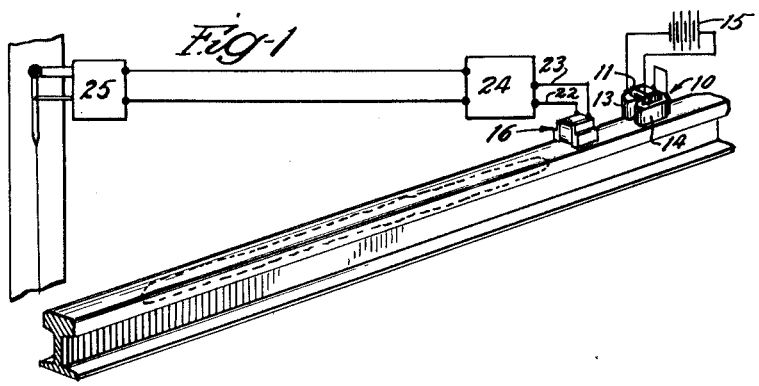
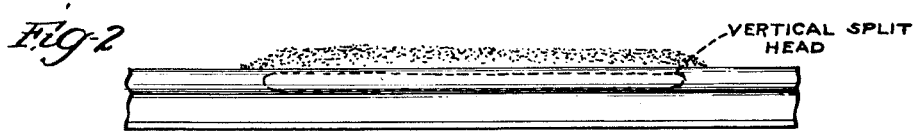
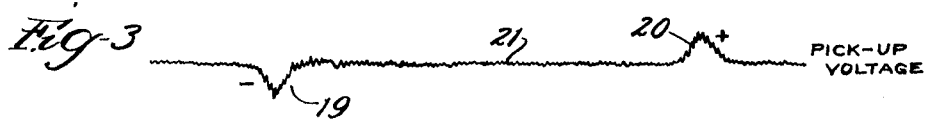
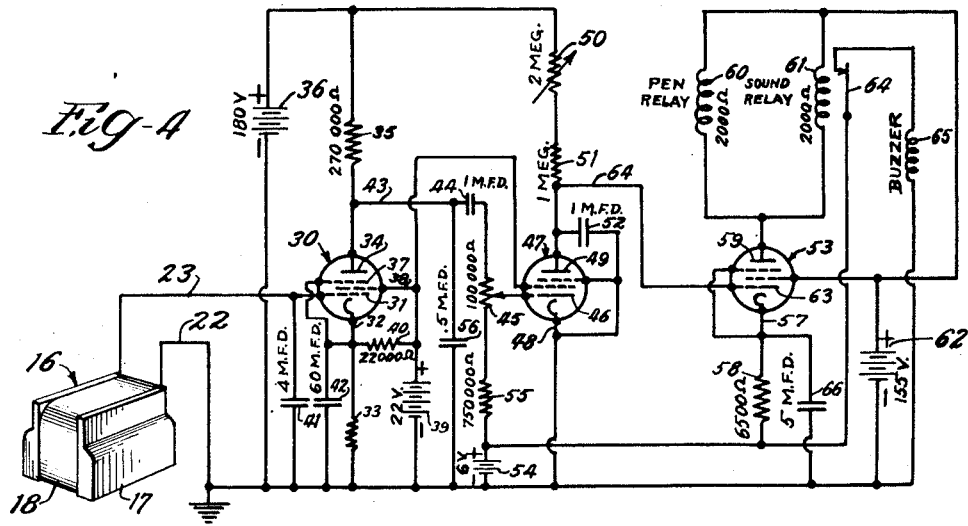
INVENTOR.
John C. Dionne
BY Mann and Brown
Attys.

Patented Oct. 14, 1952

2,614,154

UNITED STATES PATENT OFFICE 2,614,154

VERTICAL SPLIT HEAD DETECTING APPARATUS

John C. Dionne, Chicago, Ill.

Application March 28, 1950, Serial No. 152,387

6 Claims. (Cl. 175—183)

When testing rails for internal defects by the residual magnetism method such as disclosed in Barnes and Keevil Patent No. 2,317,718, issued April 27, 1943, transverse fissures are magnetized because they are normal or substantially normal to the path of the longitudinal magnetic flux that has passed through the rail. However, since vertical split heads extend longitudinally of the rail and hence are parallel to the coercive flux, it is seldom that this type of fissure becomes magnetized during normal testing operations so that it may be detected by the usual inductive pickups.

Failure to detect vertical split heads is not too serious because when a vertical split head has developed to any great extent, it is usually visible to the eye of a trained observer due to the sagging of one side of the rail head. Nevertheless, it is very desirable to locate this type of internal rail defect, and the present invention has for its principal object to provide special equipment which may be used with normal testing equipment for locating this special type of internal rail defect.

More specifically, the objects of the present include: the provision of a simple, lightweight magnet for introducing magnetism crosswise of the rail; provision of an inductive pickup that is particularly responsive to the length of the residual field that characterizes a vertical split head; and the provision of an amplifier that is tuned to the voltages and frequencies that are more or less characteristic of impulses received when the pickup traverses a vertical split head, and which is substantially unresponsive to other types of impulses.

Further and other objects of this invention will become apparent as the disclosure proceeds and the description is read in conjunction with the accompanying drawings, in which Fig. 1 is a diagrammatic, perspective view showing the placement of the energizing magnet and pickup with respect to the rail being tested;

Fig. 2 is a side elevational view of a rail with a vertical split head being indicated in dotted lines;

Fig. 3 diagrammatically represents the type of voltage impulse generated by the pickup coil as it traverses the vertical split head indicated in Fig. 2;

Fig. 4 is a diagram of the amplifier preferably used in practicing this invention; and Fig. 5 is a perspective view of the core portion of the inductive pickup.

It will be understood that the illustration in the drawings and the specific description that follows of a preferred embodiment of the invention is for the purpose of complying with section 4888 of the Revised Statutes, and is not intended to impose limitations upon the scope of the appended claims except as may be required by the prior art.

It is contemplated that the present invention will normally be used with transverse fissure detecting apparatus such as disclosed in Barnes, et al. Patent No. 2,317,718, although the inductive pickup for such equipment is preferably mounted on a carriage such as shown in the copending patent application of Walter C. Barnes and myself, filed February 18, 1950, and bearing Serial No. 144,946, the disclosure of which application is hereby incorporated by reference to the extent that it is not inconsistent with the present disclosure.

It will be understood that the vertical split head detecting equipment shown in Fig. 1 of the instant application is mounted on the detector car in the rear of the main rail-energizing and transverse flaw detecting equipment. In other words, the apparatus used for detecting vertical split heads traverses each portion of the rail after such portion of the rail is longitudinally magnetized and tested for transverse fissure defects.

Referring now to the drawings, the means for imparting crosswise magnetic flux to the rail head consists of a magnet 10 having an inverted U-shaped core 11 upon the vertical legs of which are mounted coils 13 and 14. These coils are wound in the same direction and connected in series opposition so that when the coils are energized from a D. C. source 15, magnetic flux travels in one direction through the core 11 and transversely of the rail head.

As shown in copending application, Serial No. 144,946, hereinabove referred to, the transverse magnet rides upon a carriage so that the legs of the core are maintained out of contact with the rail head, and preferably the shortest distance between the rail and the core legs is on the order of ¼ inch.

Purely by way of illustration, the magnet core may be made from 1 x 3 inch mild steel bar, the legs being about four inches long and the span between the legs approximately 2½ inches. The windings 13 and 14 are preferably of equal value and may constitute about 1300 ampere turns each.

The magnet 10 sets up a crosswise flux in the rail, and the retentivity of rail steel is such that the magnetizing force will leave the head of the rail magnetized crosswise, or at least with a transverse component. If the rail is homogeneous throughout, not only with respect to physical structure, but also magnetic properties, the residual cross-magnetization which exists in the rail following the pass of the magnet 10 will be of uniform strength along the entire length of the rail and even from rail to rail. However, if the rail has a discontinuity, such as a vertical split head, interposed in the path of the magnetizing flux, the residual magnetism above the head along the length of the split head will be different from that found above sound rail. This characteristic flux condition over a split head is indicated in Fig. 2.

An inductive pickup, generally designated 16, is used to respond to this modulation in the flux above the rail to locate the discontinuity causing the modulation. Preferably the pickup is mounted sufficiently in rear of the magnet 10 to be out of its effective field, and it has been found that a distance of at least 16 inches between the magnet and the pickup is desirable.

The pickup comprises a core 17 of high-quality magnetic iron, such as high silicon transformer steel, upon which an inductive coil 18 is suitably wound, the coil being preferably of 20,000 turns of #41 enameled wire. The pickup straddles the center portion of the head of the rail, and the span between the legs of the core is approximately $1\frac{1}{16}$ inches. The length of the core measured along the longitudinal axis of the rail is preferably on the order of $1\frac{3}{4}$ inches. The mean coil width measured along the longitudinal axis of the rail is on the order of $1\frac{3}{8}$ inches.

It will be understood that these specific dimensions and coil data are purely illustrative.

The pickup 16 is mounted as shown in copending application, Serial No. 144,946, now Patent No. 2,602,109, on a carriage which maintains the pickup a slight distance above the top of the rail head, and it will be seen that as the coil 16 traverses the characteristic magnetic flux found over a vertical split head, it will deliver a first impulse 19, which because of the polarity of the coil connection may be assumed to be negative as shown in Fig. 3, and then when the coil leaves the field over the split head, a positive impulse 20 will be generated in the coil. Between these impulses 19 and 20 will be irregular wave forms generally indicated at 21, but which generally are not of an amplitude which compares with the amplitude of impulses 19 and 20.

The output of the coil 18 is fed by wires 22 and 23 to an amplifier, generally designated 24, which consists primarily of three sections, each performing a particular function. The first stage of the amplifier may be either a pentode or twin triodes and is used primarily for voltage amplification. The values of the resistors and capacitors are suitable for the passing of relatively long, single waves.

The second stage comprises a thermionic valve in the form of a high gain pentode, and serves as a time selective device to pass only those negative impulses appearing on the grid which exceed in duration and amplitude some predetermined standard, while rejecting all others. The second stage receives signal from the first stage and is biased to have a plate current that keeps the plate voltage close to zero due to the IR drop in the plate resistors. Thus during quiescence the tube or valve is at or near maximum conduction.

The plate resistor of the second stage is relatively high so that the total plate current is small, and a relatively large bypass condenser from plate to ground is used. This combination of near-zero plate voltage, high plate resistor, and heavy condenser keeps the plate voltage of the second stage from rising high enough to drive the power tube of the next or third stage except on a long input signal of the correct polarity, and experience has shown that with but few exceptions, this type of signal occurs only at split heads. Burns and other superficial defects generally produce a higher frequency wave upon entering and leaving such fields, and hence the present amplifier discriminates between split head fields and fields caused by superficial defects.

The power or output stage of the amplifier delivers enough power on the proper signal to drive recording apparatus, generally indicated at 25, which may include a pen operated directly from such signal, or relays may be interposed for operating beside the pen, other signals such as paint gun, buzzer, etc.

More specifically, the amplifier which I prefer to use in conjunction with the pickup 16 for detecting vertical split heads is shown in Fig. 4 and, as has been stated before, comprises generally three stages, the first stage being for class A amplification of the voltage applied from the pickup coil, the second stage being of a somewhat special character which selects only those impulses which are of a predetermined minimum time duration or more for passing on to the third stage and rejecting all impulses of shorter time duration, and the third stage being a power stage for operating various indicating apparatus.

The first stage of amplification is indicated as a pentode tube, generally designated 30, which may be of the type generally known as a 7C7 tube. One side of the pickup 16 is connected to the control grid 31 and the other side is connected to ground. The cathode 32 is also connected to ground through a cathode bias 33 so that the cathode 32 is maintained slightly above zero potential. The plate 34 of the pentode 30 is connected through a plate resistor 35 to the positive side of a plate battery 36, preferably of 180 volts, so that the plate is maintained at a relatively high positive value with respect to the cathode 32. The negative side of the plate battery 36 is of course connected to ground.

The pentode 30 has a suppressor grid 37 and a screen grid 38, the latter receiving its positive potential from a screen grid battery 39, preferably of approximately 22 volts. The positive side of the battery 39 is also connected to the cathode 32 through a resistor 40 to assist in biasing the cathode to the desired positive potential with respect to the control grid.

The pickup 16 is connected to the amplifier in such manner (or polarity) that the impulse received as the pickup leaves the vertical split head field is applied to the grid 31 as a positive potential, and the tube 30 is biased so that negative impulses will have no effect. A condenser 41 connected across the leads of the pickup tends to remove high frequency voltage waves which are unimportant to the detection desired, some of which waves might be of sufficient amplitude to partially paralyze the amplifier or otherwise interfere with its normal operation. The condenser 42 is the usual bypass condenser across the cathode bias.

The various values of capacitance, resistance and voltages shown in Fig. 4 are merely illustrative of values that are satisfactory for the operation of the amplifier, and from these values it will be seen that when a positive voltage impulse is applied to the grid 31, the plate 34 will become less positive, and this voltage signal is then transmitted through conductor 43, coupling condenser 44 and variable resistance 45 to the control grid 46 of a second pentode, generally designated 47, which constitutes the second stage of the amplifier and which also may be of the 7C7 type.

The cathode 48 of this tube is connected directly to ground so that it has zero potential, and the plate 49 is connected to the positive side of the plate battery 36 through a variable resistance 50 and a fixed resistance 51, both of which are of relatively high value, so that the plate 49 is at a low potential, preferably not more than approximately a volt. With this arrangement and biasing of the tube elements, maximum plate current flows during quiescence, and when a negative signal is received on the control grid 46, the plate current decreases, thereby increasing the plate voltage and permitting the condenser 52 which is connected between the plate 49 and ground to charge, the rate of charge being determined by the rate at which current can flow through the resistances 50 and 51.

If the signal on the control grid 46 is of sufficient duration, the charge on the condenser will be built up sufficiently in voltage to trigger the power tube, generally designated 53, but if it is of insufficient duration, the partial charge built up on the condenser 52 will be dissipated as soon as the signal on the control grid 46 disappears and the tube 47 resumes conduction.

The grid 46 has a positively applied bias from a 6-volt battery 54, and this positive voltage is applied through a grid leak resistance 55 which also serves the function of preventing the positively applied bias from interfering with signal transmission. The condenser 56 is the usual bypass condenser from plate to ground in the first stage of the amplifier and acts as a blocking condenser for high frequency oscillations.

The variable resistance 45 constitutes the sensitivity control of the amplifier—i. e., controls the signal strength required for operation of the amplifier, and the variable resistance 50 constitutes the timing control, i. e., the length of the impulse required for operation of the power tube.

The power tube 53 is a more or less conventional construction and application, and may be a 6G6 tube with the cathode 57 biased to a relatively high positive potential by means of a resistor 58 connected to the positive side of the battery 54, and with the plate 59 connected through a pen relay coil 60 and sound relay coil 61 to the positive side of a power battery 62, preferably of 155 volts. Under these conditions of biasing, very little plate current flows through the tube during quiescence, but when a positive voltage of predetermined value appears on the control grid 63 which is connected by the conductor 64 to the plate 49 of the intermediate stage 47, the tube triggers and becomes highly conductive, with the result that a strong current flows through the pen relay 60 and sound relay 61 to produce the desired indications. In the case of the sound relay, an armature 64 closes when the relay coil 61 is energized to close a 6-volt circuit through a buzzer 65.

Obviously, as soon as the positive charge required for triggering the tube 53 disappears from the control grid 63, the tube returns to its quiescent non-conducting state.

The condenser 66 is a bypass condenser connected between cathode and ground that helps to keep the cathode from going too positive when the tube is conducting.

It will be understood that various modifications in the circuit and components of the amplifier may be made without departing from the spirit of this invention, and these variations within the skill of the ordinary technician are inferentially included within this disclosure. One such obvious modification is to employ twin triodes as a substitute for the first stage of amplification heretofore described, and in such a case, the connection of the pickup to the amplifier would have to be reserved so as to apply the desired polarity to the later stages of the amplifier.

I claim:

1. In apparatus for progressively testing transversely magnetized rails for vertical split heads and like flaws, the combination of an inductive pickup including a coil having its longitudinal axis set transversely of the rail and an amplifier connected to the pickup for amplifying voltage waves induced therein, said amplifier having a power supply, a first stage of voltage amplification, a second stage including a thermionic valve having cathode, grid and plate elements with a condenser connected between the plate element and ground, and with relatively high resistance in the plate circuit, said plate being maintained at a relatively low voltage during quiescence, whereby said second stage of the amplifier passes only those signals received from the first stage which are of a given polarity, amplitude, and duration, and which signals cause the plate voltage to progressively increase due to said condenser being charged from said power supply, and a third stage including a power tube responsive to signals from the second stage of predetermined amplitude and polarity.

2. In apparatus for progressively testing transversely magnetized rails for vertical split heads and like flaws, the combination of an inductive pickup including a coil having its longitudinal axis set transversely of the rail and an amplifier connected to the pickup for amplifying voltage waves induced therein, said amplifier having a power supply, a first stage of voltage amplification, a second stage including a thermionic valve having cathode, grid and plate elements with a condenser connected between the plate element and ground, and with relatively high resistance in the plate circuit, said plate being maintained at a relatively low voltage during quiescence, whereby said second stage of the amplifier passes only those signals received from the first stage which are of a given polarity, amplitude, and duration, and which signals cause the plate voltage to progressively increase due to said condenser being charged from said power supply, and a third stage including a power tube responsive to signals from the second stage of predetermined amplitude and polarity, said pickup being connected to the amplifier with such polarity that only that portion of the voltage signal which is induced in the pickup as it leaves the flaw area is transmitted through the amplifier.

3. In apparatus for progressively testing transversely magnetized rails for vertical split heads and like flaws, the combination of an inductive pickup including a coil having its longitudinal axis set transversely of the rail and an amplifier connected to the pickup for amplifying voltage waves induced therein, said amplifier having a power supply, a first stage of voltage amplification biased to transmit only positive voltage impulses from said induction coil, a second stage including a thermionic valve having cathode, grid and plate elements with a condenser connected between the plate element and ground, and with relatively high resistance in the plate circuit, said plate being maintained at a relatively low voltage during quiescence, whereby said second stage of the amplifier passes only those signals received from the first stage which are of a given polarity, amplitude, and duration, and which signals cause the plate voltage to progressively increase due to said condenser being charged from said power supply, and a third stage including a power tube responsive to signals from the second stage of predetermined amplitude and polarity.

4. In apparatus for progressively testing transversely magnetized rails for vertical split heads and like flaws, the combination of an inductive pickup including a coil having its longitudinal axis set transversely of the rail and an amplifier connected to the pickup for amplifying voltage waves induced therein, said amplifier having a power supply, a first stage of voltage amplification, a second stage including a thermionic valve having cathode, grid and plate elements with a condenser connected between the plate element and ground, and with relatively high resistance in the plate circuit, said plate being maintained at a relatively low voltage during quiescence, whereby said second stage of the amplifier passes only those signals received from the first stage which are of a given polarity, amplitude, and duration, and which signals cause the plate voltage to progressively increase due to said condenser being charged from said power supply, at least a part of the resistance in the plate circuit being variable whereby the time selectiveness of said second stage may be varied, and a third stage including a power tube responsive to signals from the second stage of predetermined amplitude and polarity.

5. In apparatus for progressively testing transversely magnetized rails for vertical split heads and like flaws, the combination of an inductive pickup including a coil having its longitudinal axis set transversely of the rail and having its mean coil width along the longitudinal axis of the rail approximately 1⅜ inches, and an amplifier connected to the pickup for amplifying voltage waves induced therein, said amplifier having a power supply, a first stage of voltage amplification, a second stage including a thermionic valve having cathode, grid and plate elements with a condenser connected between the plate element and ground, and with relatively high resistance in the plate circuit, said plate being maintained at a relatively low voltage during quiescence, whereby said second stage of the amplifier passes only those signals received from the first stage which are of a given polarity, amplitude, and duration, and which signals cause the plate voltage to progressively increase due to said condenser being charged from said power supply, and a third stage including a power tube responsive to signals from the second stage of predetermined amplitude and polarity.

6. In apparatus for progressively testing transversely magnetized rails for vertical split heads and like flaws, the combination of an inductive pickup including a coil having its longitudinal axis set transversely of the rail and an amplifier connected to the pickup for amplifying voltage waves induced therein, said amplifier having a power supply, a first stage of voltage amplification, a second stage including a thermionic valve having cathode, grid and plate elements with a condenser connected between the plate element and ground, and with relatively high resistance in the plate circuit, whereby said second stage of the amplifier passes only those signals received from the first stage which are of a given polarity, amplitude, and duration, and which signals cause the plate voltage to progressively increase due to said condenser being charged from said power supply, the plate voltage during quiescence of the valve being substantially equal to the cathode potential whereby the valve has high conductivity during such quiescence, and a third stage including a power tube responsive to signals from the second stage of predetermined amplitude and polarity.

JOHN C. DIONNE.

REFERENCES CITED

The following references are of record in the file of this patent:

UNITED STATES PATENTS

| Number | Name | Date |
| --- | --- | --- |
| 2,031,469 | Drake | Feb. 18, 1936 |
| 2,133,687 | Drake | Oct. 18, 1938 |
| 2,265,136 | Barnes et al. | Dec. 9, 1941 |
| 2,461,252 | Barnes et al. | Feb. 8, 1949 |
| 2,472,784 | Barnes et al. | June 14, 1949 |